US007647873B1

(12) United States Patent
Elflein

(10) Patent No.: US 7,647,873 B1
(45) Date of Patent: Jan. 19, 2010

(54) WHEELCHAIR/ACCESSORY SYSTEM

(75) Inventor: Matthew M. Elflein, Palm Harbor, FL (US)

(73) Assignee: LivingEaZy, Inc., Glen Allen, VA (US)

( * ) Notice: Subject to any disclaimer, the term of this patent is extended or adjusted under 35 U.S.C. 154(b) by 223 days.

(21) Appl. No.: 11/811,763

(22) Filed: Jun. 12, 2007

(51) Int. Cl.
*B62J 11/00* (2006.01)

(52) U.S. Cl. ............................... 108/158.11; 280/304.1

(58) Field of Classification Search ............. 280/304.1; 108/158.11
See application file for complete search history.

(56) References Cited

U.S. PATENT DOCUMENTS

| | | | |
|---|---|---|---|
| 2,026,011 | A | 12/1935 | Wright |
| 2,535,112 | A | 12/1950 | Woody |
| 2,696,963 | A | 12/1954 | Shepherd |
| 2,994,501 | A | 8/1961 | Barnard |
| 3,265,436 | A | 8/1966 | La Bombard et al. |
| 3,543,312 | A | 12/1970 | Pofferi |
| 3,586,367 | A | 6/1971 | Cincotta |
| 3,602,466 | A | 8/1971 | Drowns |
| 4,270,721 | A | 6/1981 | Mainor, Jr. |
| 4,449,750 | A | 5/1984 | Pultman |
| 4,458,870 | A | 7/1984 | Duncan et al. |
| 4,566,732 | A | 1/1986 | Ostergaard, II et al. |
| 4,645,167 | A | 2/1987 | Hardwick |
| 4,753,449 | A | 6/1988 | Doucet |
| 4,878,642 | A | 11/1989 | Kirby, Jr. |
| 4,878,685 | A | 11/1989 | Bahm |
| 4,884,512 | A | 12/1989 | Kelly |
| 5,040,813 | A | 8/1991 | Cumbie |
| 5,050,929 | A | 9/1991 | Gueringer |
| 5,074,574 | A | 12/1991 | Carwin |
| 5,333,333 | A | 8/1994 | Mah |
| 5,356,107 | A | 10/1994 | Sinohuiz |
| 5,374,074 | A | 12/1994 | Smith |
| 5,431,364 | A | 7/1995 | Etter |
| 5,476,241 | A | 12/1995 | Helman |
| 5,609,321 | A | 3/1997 | McClellan |
| 5,775,654 | A | 7/1998 | Price |
| 5,813,948 | A | 9/1998 | Quigg |
| 5,865,124 | A | 2/1999 | Wroe |
| 5,887,940 | A | 3/1999 | Anderson et al. |
| 5,893,607 | A | 4/1999 | Trimnell |
| 6,056,246 | A | 5/2000 | Argy, II |
| 6,209,835 | B1 | 4/2001 | Walrath et al. |

(Continued)

OTHER PUBLICATIONS

PCT—International Search Report and Written Opinion of International Searching Authority (Sep. 24, 2008).

*Primary Examiner*—Kevin Hurley
(74) *Attorney, Agent, or Firm*—Troutman Sanders LLP; Bernard G. Pike

(57) ABSTRACT

A wheelchair has a frame with rails and wheels. An accessory is adapted to be removably coupled to a rail. The accessory has a short downwardly extending cylindrical projection. A coupling assembly extends between the accessory and the frame. The coupling assembly includes a bottom subassembly. The bottom subassembly is adapted to encompass a rail. The rail has a vertically extending lower component. The lower component has a cylindrical vertical recess. The coupling assembly also includes an extension subassembly. The extension subassembly is provided between the bottom subassembly and the accessory. A supplemental cylindrical recess is provided in the accessory above its projection. The recess is adapted to receive a supplemental component.

4 Claims, 3 Drawing Sheets

U.S. PATENT DOCUMENTS 6,254,116 B1 7/2001 Szumlic et al.
6,390,426 B1 5/2002 Berry
6,622,981 B1 9/2003 Hsieh
6,685,264 B2 2/2004 Mullen et al.
6,796,536 B1 9/2004 Sevier, IV
6,908,249 B2 6/2005 Tomm
7,065,319 B1 6/2006 Hartley
7,082,882 B2 8/2006 Heimbrock
7,152,834 B2 12/2006 Hsu
7,243,991 B2 * 7/2007 Ojeda .................... 297/188.14
2004/0207244 A1 10/2004 McKellar
2005/0056747 A1 3/2005 Belcourt et al.
2007/0182233 A1 8/2007 Boyko

* cited by examiner

FIG 1
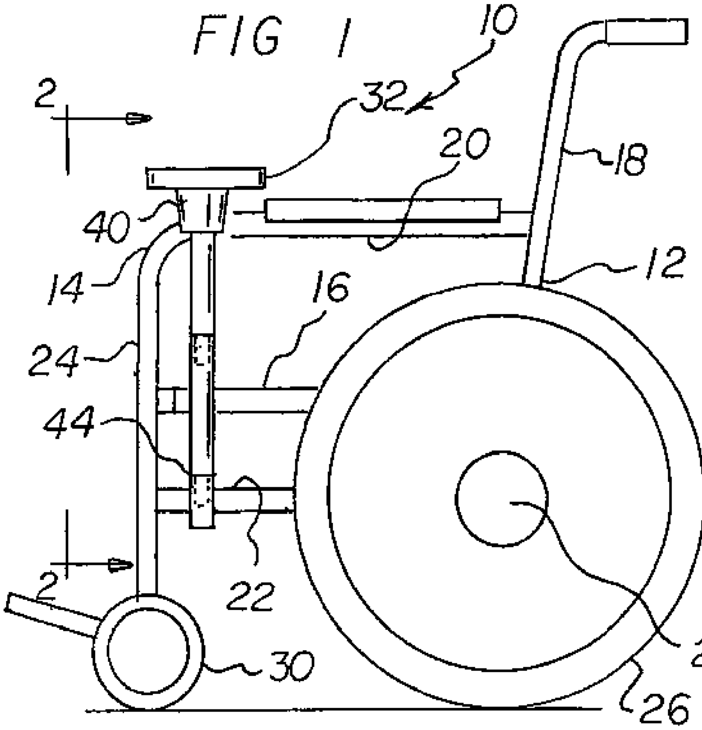
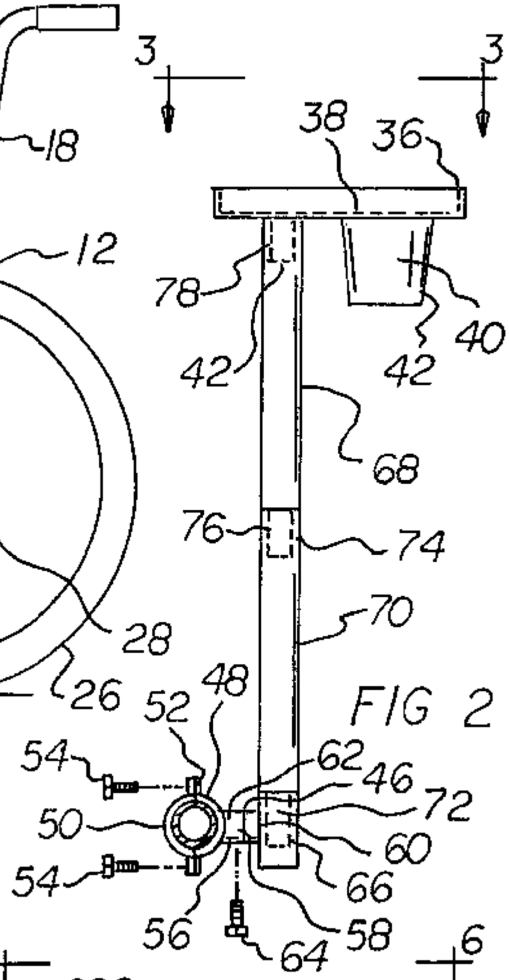
FIG 2
FIG 3
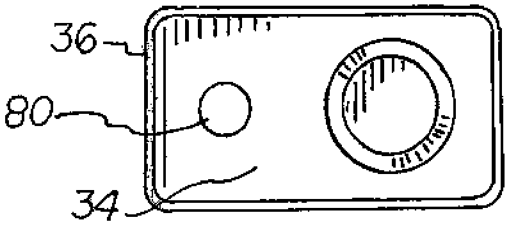
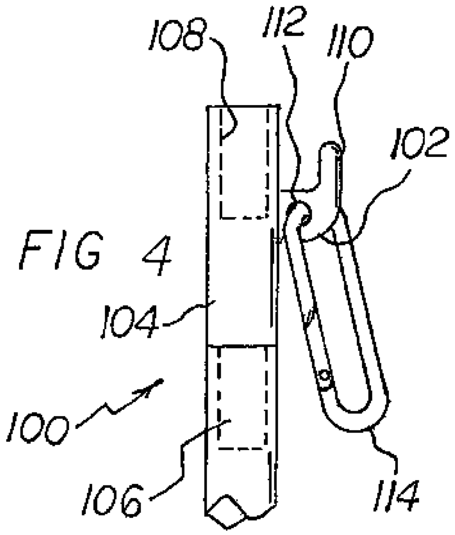
FIG 4
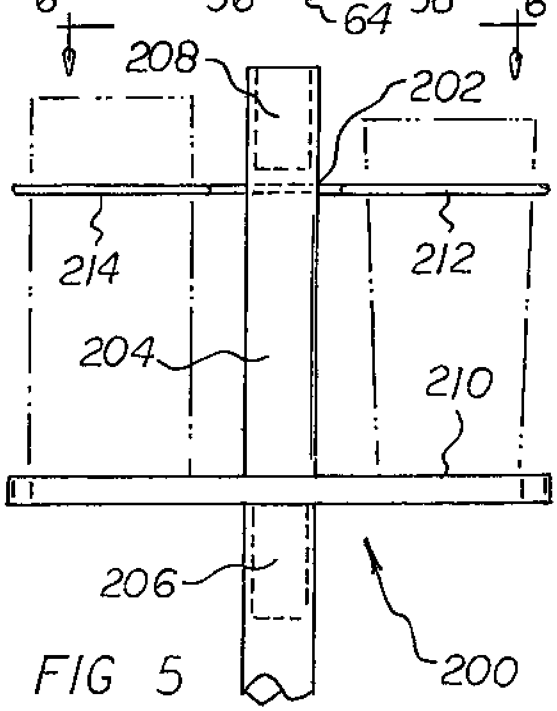
FIG 5

WHEELCHAIR/ACCESSORY SYSTEM

BACKGROUND OF THE INVENTION

1. Field of the Invention

The present invention relates to a wheelchair/accessory system and more particularly pertains to extending the safety and utility of a wheelchair and for increasing the comfort and convenience to a user.

2. Description of the Prior Art

The use of mobility accessories of known designs and configurations is known in the prior art. More specifically, mobility accessories of known designs and configurations previously devised and utilized for the purpose of providing convenience to a user through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,813,948 issued Sep. 29, 1998 to Quigg relates to a Walker. U.S. Pat. No. 5,050,929 issued Sep. 24, 1991 to Gueringer relates to an Auxiliary Furniture Tray System. Lastly, U.S. Pat. No. 4,884,512 issued Dec. 5, 1989 to Kelly relates to a Platform Stabilizer.

While these devices fulfill their respective, particular objectives and requirements, the aforementioned patents do not describe a wheelchair/accessory system that allows for extending the safety and utility of a wheelchair and for increasing the comfort and convenience to a user.

In this respect, the wheelchair/accessory system according to the present invention substantially departs from the conventional concepts and designs of the prior art, and in doing so provides an apparatus primarily developed for the purpose of extending the safety and utility of a wheelchair and for increasing the comfort and convenience to a user.

Therefore, it can be appreciated that there exists a continuing need for a new and improved wheelchair/accessory system which can be used for extending the safety and utility of a wheelchair and for increasing the comfort and convenience to a user. In this regard, the present invention substantially fulfills this need.

SUMMARY OF THE INVENTION

In view of the foregoing disadvantages inherent in the known types of mobility accessories of known designs and configurations now present in the prior art, the present invention provides an improved wheelchair/accessory system. As such, the general purpose of the present invention, which will be described subsequently in greater detail, is to provide a new and improved wheelchair/accessory system and method which has all the advantages of the prior art and none of the disadvantages.

To attain this, the present invention essentially comprises a wheelchair/accessory system. First provided is a wheelchair. The wheelchair has a frame. The frame has laterally spaced horizontal seat rails. The frame has laterally spaced generally vertical back rails. The frame also has laterally spaced horizontal arm rails. The arm rails are provided forward of the back rails above the seat rails. The frame also has laterally spaced horizontal leg rails. The leg rails are provided forward of the back rails below the seat rails. The frame also has laterally spaced vertical front rails. The front rails are coupled to the arm rails and the seat rails and leg rails. The wheelchair has large wheels. The large wheels are positioned laterally outwardly of all the rails. An axis is provided. The axis is provided beneath the back rails and beneath the seat rails. The wheelchair has small wheels. The small wheels are positioned beneath the front rails.

An accessory is provided. The accessory is adapted to be removably coupled to the wheelchair at a location above one of the arm rails forward of one of the back rails. The accessory has a horizontal planar support surface. The support surface is in a rectangular configuration. The support surface has an upwardly extending peripheral flange. A circular aperture is provided through the support surface. A cup is provided. The aperture receives and removably supports the cup. The cup has a generally conical surface. The support surface has a short downwardly extending cylindrical projection. The projection is laterally spaced from the aperture.

Provided next is a coupling assembly. The coupling assembly is extends between the accessory and the frame. The coupling assembly includes a bottom subassembly. The bottom assembly has an interior semi-circular section. The bottom section has an exterior semi-circular section. The semi-circular sections are adapted to encompass one of the leg rails. The semi-circular sections have vertical projections. The semi-circular sections have threaded coupling apertures and coupling bolts. The coupling bolts extend through the coupling apertures for coupling purposes. The interior semi-circular section has a horizontally projecting female member. The female member has a cylindrical recess. The recess is formed with a threaded rotational positioning aperture. The bottom subassembly has a vertically extending lower component. The lower component has a horizontally projecting male member. A cylindrical projection is positioned in the cylindrical recess. A rotational positioning bolt is provided in the rotational positioning aperture. In this manner rotational positioning is provided. The vertically extending lower component has a cylindrical vertical recess.

The coupling assembly also has an extension subassembly. The extension subassembly includes a vertical upper component. The extension subassembly includes a similarly configured vertical intermediate component. The intermediate component has a lower end. The lower end has a downwardly extending cylindrical projection. The projection is positioned within the vertical recess of the bottom component. The intermediate component has an upper end. The upper end has a vertically extending cylindrical recess. The upper component has a lower end. The lower end has a downwardly extending cylindrical projection. The projection is positioned within the vertical recess of the intermediate component. The upper component has an upper end. The upper end has a vertically extending cylindrical recess. The recess receives the projection of the accessory.

Provided last is a supplemental cylindrical recess. The recess is provided the planar surface of the accessory above its projection. The recess is adapted to receive a supplemental component.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining plural embodiments of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved wheelchair/accessory system which has all of the advantages of the prior art mobility accessories of known designs and configurations and none of the disadvantages.

It is another object of the present invention to provide a new and improved wheelchair/accessory system which may be easily and efficiently manufactured and marketed.

It is further object of the present invention to provide a new and improved wheelchair/accessory system which is of durable and reliable constructions.

An even further object of the present invention is to provide a new and improved wheelchair/accessory system which is susceptible of a low cost of manufacture with regard to both materials and labor, and which accordingly is then susceptible of low prices of sale to the consuming public, thereby making such wheelchair/accessory system economically available to the buying public.

Even still another object of the present invention is to provide a wheelchair/accessory system for extending the safety and utility of a wheelchair and for increasing the comfort and convenience to a user.

Lastly, it is an object of the present invention to provide a new and improved wheelchair/accessory system. A wheelchair has a frame with rails and wheels. An accessory is adapted to be removably coupled to a rail. The accessory has a short downwardly extending cylindrical projection. A coupling assembly extends between the accessory and the frame. The coupling assembly includes a bottom subassembly. The bottom subassembly is adapted to encompass a rail. The rail has a vertically extending lower component. The lower component has a cylindrical vertical recess. The coupling assembly also includes an extension subassembly. The extension subassembly is provided between the bottom subassembly and the accessory. A supplemental cylindrical recess is provided in the accessory above its projection. The recess is adapted to receive a supplemental component.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a wheelchair/accessory system constructed in accordance with the principles of the present invention.

FIG. 2 is an enlarged front elevational view taken along line 2-2 of FIG. 1.

FIG. 3 is an enlarged plan view taken along line 3-3 of FIG. 2.

FIG. 4 is a side elevational view of one component of a wheelchair/accessory system constructed in accordance with an alternate embodiment of the invention.

FIG. 5 is a front elevational view of components of a wheelchair/accessory system constructed in accordance with the second alternate embodiment of the invention.

The same reference numerals refer to the same parts throughout the various Figures.

DESCRIPTION OF THE PREFERRED EMBODIMENT

Figure 6:
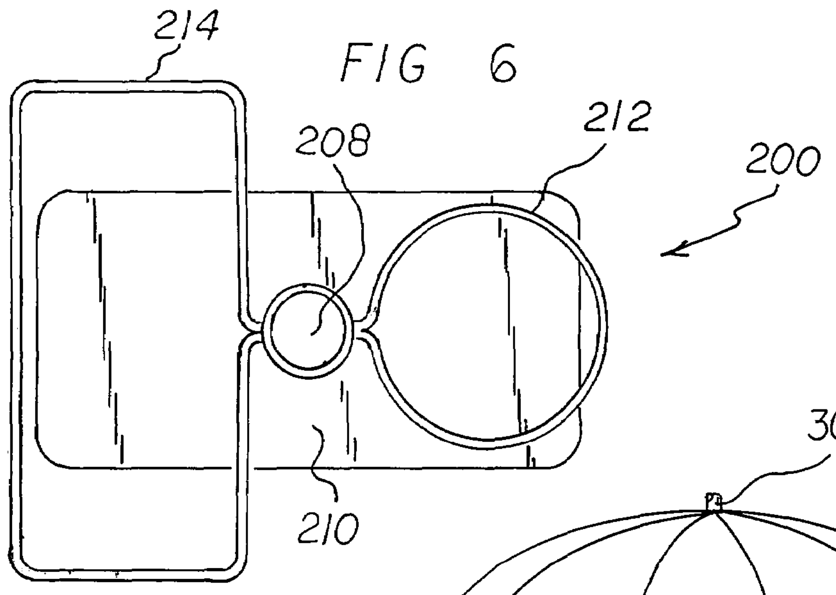
FIG. 6 is an enlarged plan view taken along line 6-6 of FIG. 5.

With reference now to the drawings, and in particular to FIG. 1 thereof, the preferred embodiment of the new and improved wheelchair/accessory system embodying the principles and concepts of the present invention and generally designated by the reference numeral 10 will be described.

The present invention, the wheelchair/accessory system 10 is comprised of a plurality of components. Such components in their broadest context include a wheelchair, an accessory, a coupling assembly and a supplemental cylindrical recess. Such components are individually configured and correlated with respect to each other so as to attain the desired objective.

First provided is a wheelchair 12. The wheelchair has a frame 14. The frame has laterally spaced horizontal seat rails 16. The frame has laterally spaced generally vertical back rails 18. The frame also has laterally spaced horizontal arm rails 20. The arm rails are provided forward of the back rails above the seat rails. The frame also has laterally spaced horizontal leg rails 22. The leg rails are provided forward of the back rails below the seat rails. The frame also has laterally spaced vertical front rails 24. The front rails are coupled to the arm rails and the seat rails and leg rails. The wheelchair has large wheels 26. The large wheels are positioned laterally outwardly of all the rails. An axis 28 is provided. The axis is provided beneath the back rails and beneath the seat rails. The wheelchair has small wheels 30. The small wheels are positioned beneath the front rails.

One skilled in the art would recognize that the basic configuration of a wheel chair is as varied as the manufacturer. The necessary component is, however, bracing to provide the strength to carry a person's weight. The frame, in any one of the many varied configurations, achieves this purpose. Frame members may be perpendicular to one another or may be angled to one another, depending on configuration of the wheelchair.

An accessory 32 is provided. The accessory is adapted to be removably coupled to the wheelchair at a location above one of the arm rails forward of one of the back rails. The accessory has a horizontal planar support surface 34. The support surface is in a rectangular configuration. In the preferred embodiment the support surface has an upwardly extending peripheral flange 36, though in other embodiments the flange may not be present. In that configuration the support surface may be a planar surface.

A circular aperture 38 is provided through the support surface. A cup 40 is provided. The aperture receives and removably supports the cup. The cup has a generally conical surface. The support surface has a short downwardly extending cylindrical projection 42. The projection is laterally spaced from the aperture.

Provided next is a coupling assembly 44. The coupling assembly is extends between the accessory and the frame. The coupling assembly includes a bottom subassembly 46. The bottom assembly has an interior semi-circular section 48. The bottom section has an exterior semi-circular section 50. The semi-circular sections are adapted to encompass one of the leg rails. On skilled in the art would recognize, however, that any part of the wheelchair frame may serve as a mounting point for the coupling assembly.

The semi-circular sections have vertical projections 52. The semi-circular sections have threaded coupling apertures and coupling bolts 54. The coupling bolts extend through the coupling apertures for coupling purposes. The interior semi-circular section has a horizontally projecting female member 56. The female member has a cylindrical recess. The recess is formed with a threaded rotational positioning aperture 58. The bottom subassembly has a vertically extending lower component 60. The lower component has a horizontally projecting male member 62. A cylindrical projection is positioned in the cylindrical recess. A rotational positioning bolt 64 is provided in the rotational positioning aperture. In this manner rotational positioning and rotational locking is provided. The vertically extending lower component has a cylindrical vertical recess 66.

The coupling assembly also has an extension subassembly. The extension subassembly includes a vertical upper component 68. The extension subassembly includes a similarly configured vertical intermediate component 70. The intermediate component has a lower end. The lower end has a downwardly extending cylindrical projection 72. The projection is positioned within the vertical recess of the bottom component. The intermediate component has an upper end. The upper end has a vertically extending cylindrical recess 74. The upper component has a lower end. The lower end has a downwardly extending cylindrical projection 76. The projection is positioned within the vertical recess of the intermediate component. The upper component has an upper end. The upper end has a vertically extending cylindrical recess 78. The recess receives the projection of the accessory.

Provided last is a supplemental cylindrical recess 80. The recess is provided the planar surface of the accessory above its projection. The recess is adapted to receive a supplemental component.

From a generic standpoint, the invention includes a wheelchair which has a frame with rails and wheels. An accessory is adapted to be removably coupled to a rail. The accessory has a short downwardly extending cylindrical projection. A coupling assembly extends between the accessory and the frame. The coupling assembly includes a bottom subassembly. The bottom subassembly is adapted to encompass a rail. The rail has a vertically extending lower component. The lower component has a cylindrical vertical recess. The coupling assembly also includes an extension subassembly. The extension subassembly is provided between the bottom subassembly and the accessory. A supplemental cylindrical recess is provided in the accessory above its projection. The recess is adapted to receive a supplemental component.

An alternate embodiment of the present invention is system 100 shown in FIG. 4. An accessory 102 is provided. The accessory is a hook and close-able loop. This accessory allows a person confined to a wheel chair to carry articles in plastic shopping bags. The hook allows the bags to be hooked and carried. The close-able loop may also be used to secure the looped handles of the plastic shopping bags. In this way the person can carry good from the store without fear of dropping and damaging the goods. The accessory further includes a vertically extending rod 104. The vertically extending rod has a downwardly extending projection 106. The projection is provided at the lower end of the rod. The projection is positionable in the supplemental cylindrical recess of the accessory. An upwardly facing recess 108 is provided. The upwardly facing recess is provided at the upper end of the rod. The rod is formed with an L-shaped finger 110. An aperture 112 is provided through the finger adjacent to a central extent of the finger. A carabineer ring 114 is provided. The carabineer ring is positioned within the aperture. The carabineer ring is configured to secure articles such as laundry basket and plastic shopping bags. The upward facing recess 108 allows for the stacking of accessories. In the case of the L-shaped finger and carabineer ring accessory, the recess 108 allows the user to place another accessory, such as an umbrella, into the recess. In this way the person may push his or her wheelchair in the rain, without concern for dropping the articles held by the carabineer ring or hook.

A second alternate embodiment of the present invention, system 200, is shown in FIGS. 5 and 6. An accessory 202 is provided. The accessory further includes a vertically extending rod 204. The vertically extending rod has a downwardly extending projection 206. The projection is provided at the lower end of the rod. The projection is positionable in the supplemental cylindrical recess of the accessory. An upwardly facing recess 208 is provided. The upwardly facing recess is provided at the upper end of the rod. The rod is formed with a horizontally disposed rectangular support surface 210. The support surface is provided adjacent to the lower end. Wire supports 212, 214 are provided. The wire supports are provided adjacent to the upper end. The wire supports are adapted to provide stability to objects on the support surface.

This accessory is configured, in one embodiment, to accommodate a large soft drink and a bag, or container, of popcorn. The wire supports may be somewhat malleable, so as allow a user to conform the wire support to the container the person desires the support to contain.

Figure 7:
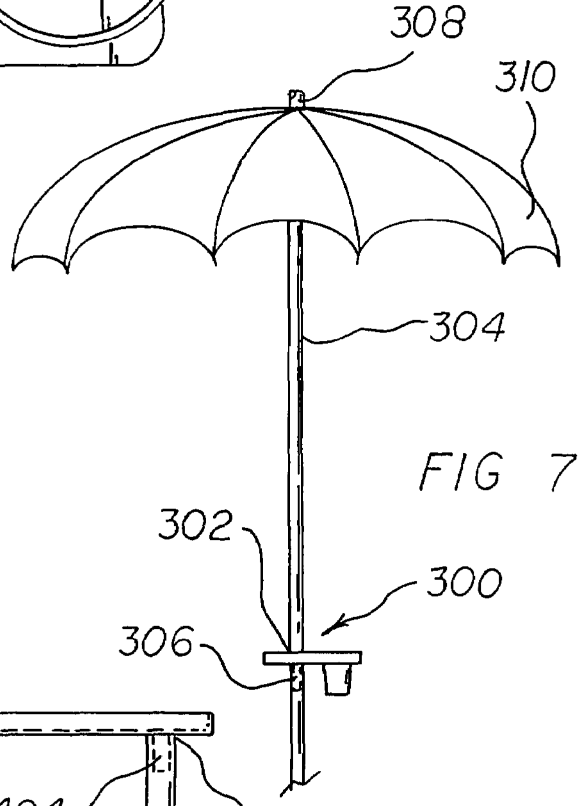
FIG. 7 is a front elevational view of components of a wheelchair/accessory system constructed in accordance with the third alternate embodiment of the invention.

Shown in FIG. 7 is a third alternate embodiment of the present invention, system 300. An accessory 302 is provided. The accessory further includes a vertically extending rod 304. The vertically extending rod has a downwardly extending projection 306. The projection is provided at the lower end of the rod. The projection is positionable in the supplemental cylindrical recess of the accessory. The vertically extending rod has an upper end 308. The rod is formed as an umbrella shaft. The lower end constitutes a handle. The upper end is formed as a rain shield 310.

The system 400 of the fourth alternate embodiment of the present invention is provided. Note FIG. 8. An accessory 402 is provided. The accessory is removably coupled to laterally disposed rails. The accessory has laterally disposed short downwardly extending cylindrical projections 404. The coupling assembly extends between the accessory and the frame. The coupling assembly includes bottom subassemblies 406. The bottom subassemblies are adapted to encompass laterally disposed rails. The bottom subassemblies have vertically extending lower components 408. The lower components have cylindrical vertical recesses. The coupling assembly also has laterally disposed extension subassemblies 410. The laterally disposed extension subassemblies are provided between the bottom subassemblies and the accessory.

Figure 8:
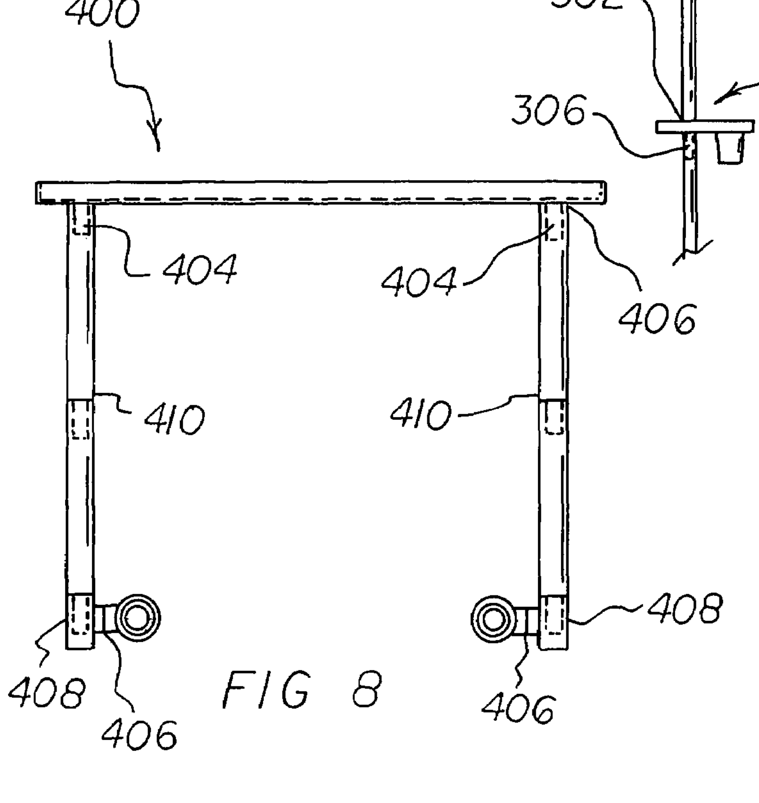
FIG. 8 is a front elevational view of components of a wheelchair/accessory system constructed in accordance with the fourth alternate embodiment of the invention.

In general, FIG. 8 demonstrates the use of two devices on a single wheelchair. This allows a firm mount for a planar surface, such as a writing desk top, to be affixed to the wheelchair. In this embodiment the desktop accessory has two mounting points so as to receive the two extension subassemblies. The advantage of two mounting points is strength, stability, and increased weight capacity over one mounting point.

Figure 9:
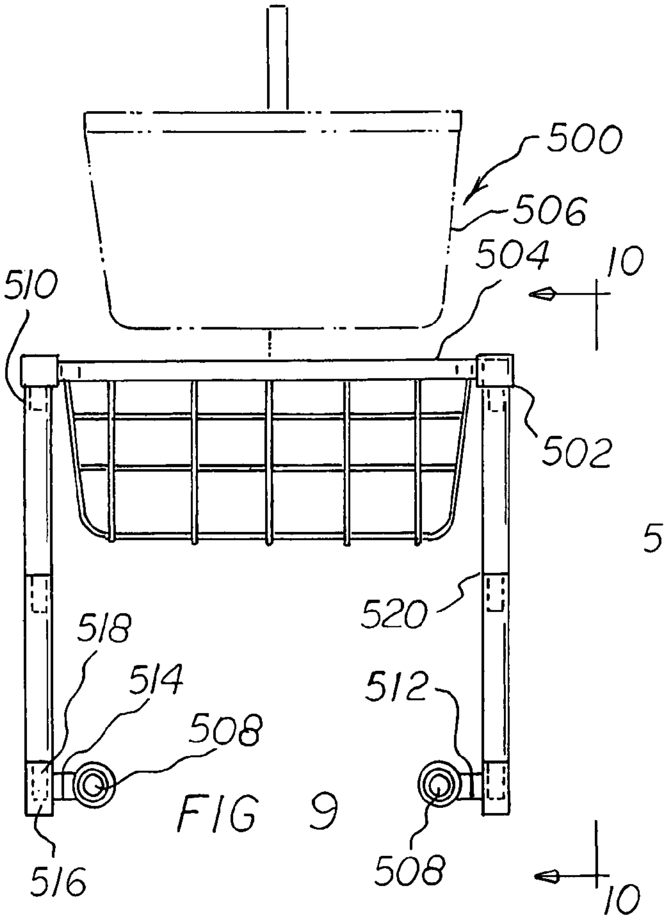
FIG. 9 is a front elevational view of components of a wheelchair/accessory system constructed in accordance with the fifth alternate embodiment of the invention.
Figure 10:
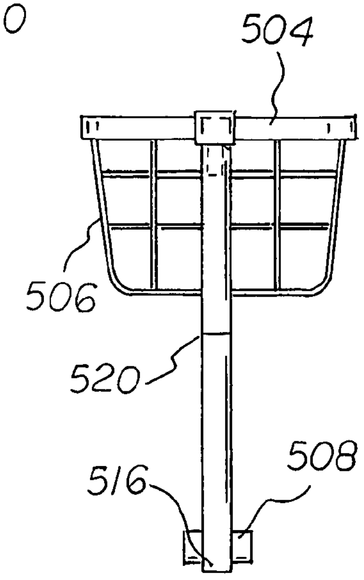
FIG. 10 is an end elevational view taken along line 10-10 of FIG. 9.

The fifth alternate embodiment of the invention is a system 500 illustrated in FIGS. 9 and 10. In such system, the accessory 502 is a peripheral frame 504 adapted to removably receive a basket 506. The accessory is removably coupled to laterally disposed rails 508. The accessory has laterally disposed short downwardly extending cylindrical projections 510. The coupling assembly 512 extends between the accessory and the frame and includes bottom subassemblies 514 adapted to encompass laterally disposed rails. The vertically extending lower components 516 have cylindrical vertical recesses 518. The coupling assembly also has laterally disposed extension subassemblies 520 between the bottom subassemblies and the accessory.

Figure 11:
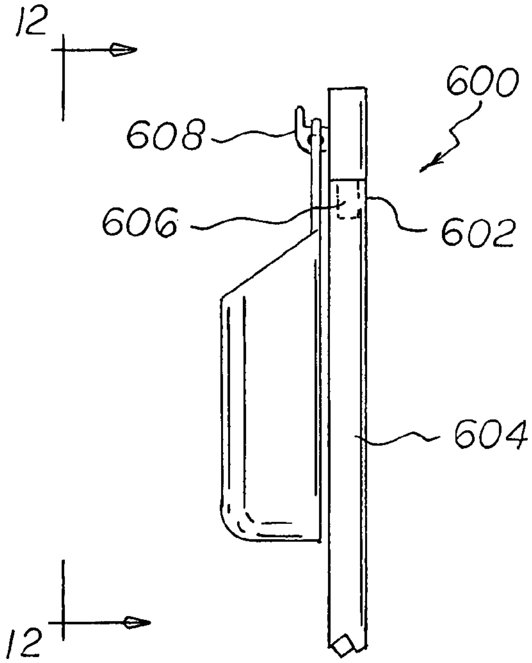
FIG. 11 is a front elevational view of components of a wheelchair/accessory system constructed in accordance with the sixth alternate embodiment of the invention.
Figure 12:
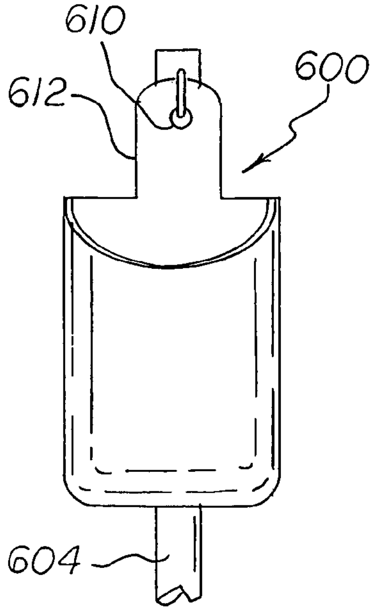
FIG. 12 is a side elevational view taken along line 12-12 of FIG. 11.

The sixth alternate embodiment of the invention is a system 600 illustrated in FIGS. 11 and 12. In such system, the accessory 602 further includes a vertically extending rod 604 with a downwardly extending projection at its lower end and an upwardly facing recess 606 at its upper end. The rod is formed with an L-shaped finger 68. The finger is adapted to receive and support an aperture 610 in a bag 612.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A wheelchair/accessory system comprising:

a wheelchair having a frame with rails and wheels;

an accessory adapted to be removably coupled to a rail with a short downwardly extending cylindrical projection and a supplemental cylindrical recess; the accessory further includes a vertically extending rod with a downwardly extending projection at its lower end positioned in the supplemental cylindrical recess of the accessory and an upwardly facing recess at its upper end, the rod being formed with an L-shaped finger with an aperture through the finger adjacent to a central extent thereof and a carabineer ring positioned within the aperture, the carabineer ring adapted to secure a laundry basket and like objects;

a coupling assembly extending between the accessory and the frame including a bottom subassembly adapted to encompass a rail with a vertically extending lower component having a cylindrical vertical recess; and the coupling assembly also including an extension subassembly between the bottom subassembly and the accessory.

2. The system as set forth in claim 1 wherein the accessory has a horizontal planar support surface in a rectangular configuration with an upwardly extending peripheral flange, the support surface having a circular aperture there through for receiving and removably supporting a cup with a generally conical surface, the short downwardly extending cylindrical projection being laterally spaced from the aperture.

3. A wheelchair/accessory system comprising:

a wheelchair having a frame with rails and wheels;

an accessory adapted to be removably coupled to a rail; wherein the accessory includes a vertically extending rod with a downwardly extending projection at its lower end connected to the vertical recess in the coupling assembly and an upwardly facing recess at its upper end, the rod being formed with an L-shaped finger adapted to receive and support an aperture in a bag;

a coupling assembly extending between the accessory and the frame including a bottom subassembly adapted to encompass a rail with a vertically extending lower component having a cylindrical vertical recess;

the coupling assembly also including an extension subassembly between the bottom subassembly and the accessory.

4. A wheelchair/accessory system for extending the safety and utility of a wheelchair and for increasing the comfort and convenience to a user comprising, in combination:

a wheelchair having a frame, the frame having laterally spaced horizontal seat rails with laterally spaced generally vertical back rails, the frame also having laterally spaced horizontal arm rails forward of the back rails above the seat rails and laterally spaced horizontal leg rails forward of the back rails below the seat rails, the frame also having laterally spaced vertical front rails coupled to the arm rails and the seat rails and leg rails, the wheelchair having large wheels positioned laterally outwardly of all the rails with an axis beneath the back rails and beneath the seat rails, the wheelchair having small wheels positioned beneath the front rails;

an accessory adapted to be removably coupled to the wheelchair at a location above one of the arm rails forward of one of the back rails, the accessory having a horizontal planar support surface in a rectangular configuration with an upwardly extending peripheral flange, the support surface having a circular aperture there through for receiving and removably supporting a cup with a generally conical surface, the support surface having a short downwardly extending cylindrical projection laterally spaced from the aperture;

a coupling assembly extending between the accessory and the frame, the coupling assembly including a bottom subassembly with an interior semi-circular section with an exterior semi-circular section, the semi-circular sections adapted to encompass one of the leg rails, the semi-circular sections having vertical projections with threaded coupling apertures and coupling bolts extending through the coupling apertures for coupling purposes, the interior semi-circular section having a horizontally projecting female member with a cylindrical recess formed with a threaded rotational positioning aperture, the bottom subassembly having a vertically extending lower component with a horizontally projecting male member with a cylindrical projection positioned in the cylindrical recess and a rotational positioning bolt in the rotational positioning aperture for rotational positioning purposes, the vertically extending lower component having a cylindrical vertical recess;

the coupling assembly also having an extension subassembly including a vertical upper component and a similarly configured vertical intermediate component, the intermediate component having a lower end with a downwardly extending cylindrical projection positioned within the vertical recess of the bottom component and an upper end with a vertically extending cylindrical recess, the upper component having a lower end with a downwardly extending cylindrical projection positioned within the vertical recess of the intermediate component and an upper end with a vertically extending cylindrical recess to receive the projection of the accessory; and a supplemental cylindrical recess in its planar surface of the accessory above its projection adapted to receive a supplemental component.

* * * * *